US008990465B2

(12) United States Patent
DeCesaris et al.

(10) Patent No.: US 8,990,465 B2
(45) Date of Patent: Mar. 24, 2015

(54) DEVICE PRESENCE DETECTION USING A SINGLE CHANNEL OF A BUS

(71) Applicant: International Business Machines Corporation, Armonk, NY (US)

(72) Inventors: Michael DeCesaris, Carrboro, NC (US); John A. Henise, IV, Silver Spring, MD (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 271 days.

(21) Appl. No.: 13/709,015

(22) Filed: Dec. 9, 2012

(65) Prior Publication Data
US 2014/0164660 A1   Jun. 12, 2014

(51) Int. Cl.
*G06F 13/36* (2006.01)
*G06F 13/362* (2006.01)
*G06F 13/42* (2006.01)
*G06F 13/364* (2006.01)

(52) U.S. Cl.
CPC .......... *G06F 13/4291* (2013.01); *G06F 13/364* (2013.01); *G06F 2213/0052* (2013.01); *G06F 2213/0016* (2013.01); *G06F 13/3625* (2013.01)
USPC ........................................ 710/113; 710/117

(58) Field of Classification Search
None
See application file for complete search history.

(56) References Cited

U.S. PATENT DOCUMENTS

| 7,082,488 | B2* | 7/2006 | Larson et al. ................ 710/301 |
| 7,979,597 | B2* | 7/2011 | Deshpande et al. ............ 710/14 |
| 2005/0002384 | A1 | 1/2005 | Larson et al. |
| 2009/0006673 | A1* | 1/2009 | Bland et al. ..................... 710/58 |
| 2012/0079160 | A1 | 3/2012 | Iyer et al. |
| 2014/0189177 | A1* | 7/2014 | Flint et al. ..................... 710/110 |

FOREIGN PATENT DOCUMENTS

| CN | 101354673 A | 1/2009 |
| CN | 101533380 A | 9/2009 |
| TW | 200918918 A | 5/2009 |

OTHER PUBLICATIONS

Disclosed Anonymously, Method for Bi-Directional Communications Using I2C Buses [online], [retreived Nov. 3, 2014] Aug. 2, 2011, Retrieved from the internet: < URL http://www.ip.com/XXXXXX> <IPCOM doc. ID 000209388D>.*
Downs, R. "Using 1-Wire I/O for Distributed System Monitoring". Wescon//98. Sep. 15-17, 1998. pp. 161-168. DOI:10.1109/WESCON.1998.716439.

* cited by examiner

*Primary Examiner* — Tim T Vo
*Assistant Examiner* — Jasper J Harris
(74) *Attorney, Agent, or Firm* — Katherine S. Brown; Jeffrey L. Streets (57) ABSTRACT

The presence of devices attached to a bus are detected by a controller of a bus transmitting a signal on a channel of the bus, to cause each device to hold the channel to a first logical state for a duration of time that is unique to each device. The device that holds the channel to the first logical state for the longest duration of time is detected. Detected devices remain idle while undetected devices repeat holding the channel to the first logical state for the duration of time, until detected. All devices are detected when the channel returns to a second logical state.

18 Claims, 5 Drawing Sheets

DEVICE PRESENCE DETECTION USING A SINGLE CHANNEL OF A BUS

FIELD OF THE INVENTION

The present invention relates generally to a computing system detecting the presence of devices connected to a bus and more particularly to using a single channel or circuit line of an existing computing device bus for detecting the presence of devices connected to the bus.

BACKGROUND OF THE INVENTION

Architectural designs for computing devices connect internal components by a communications channel referred to as a bus. Various devices, such as integrated circuits (ICs), and devices that include ICs are typically attached to a bus that is controlled by one or more programmable microcontrollers.

A capability for detection of attached compatible devices of a computing system is typically included in computer architectural designs. This is done to improve reliability and accurately isolate error detection related to hardware attached through slots or pluggable sockets. Presence detection of devices is generally accomplished by use of a dedicated pin on the hardware interface into which the device is plugged. The dedicated pin carries a signal indicating the presence of the device when the device is attached, and the signal discontinues when the device is removed. The dedicated signal pin is typically sampled by circuit logic, which allows system management software to identify whether a device is present.

The approach of using dedicated pins for device detection incurs additional manufacturing cost of the computer system and attachable devices. Additionally, in computer system and component designs, having additional, dedicated pins and signal lines for device presence detection is a detractor to the continuous challenge of greater density and complexity of circuit design.

An example of a bus architecture designed to attach IC devices is the Inter-Integrated Circuit bus, also known as the I2C ("I-two-see") or I$^2$C ("I-squared-see")-bus. The I2C bus is used to attach low-speed peripherals to a motherboard, embedded system, cellphone, or other electronic device.

ICs that are compatible with the I2C bus have an "on-chip" interface that allows them to communicate directly via the bus. The I2C bus has become a well established world standard that is implemented in over 1000 different ICs and is used in several control architectures such as System Management Bus (SMBus), Power Management Bus (PMBus), Intelligent Platform Management Interface (IPMI), Display Data Channel (DDC) and Advanced Telecom Computing Architecture (ATCA).

The I2C bus is a simple bidirectional 2-wire bus used for inter-integrated circuit control. The two wires used are a serial data line (SDA) and a serial clock line (SCL). A master/slave relationship is used for transactions between the devices and microcontrollers and devices attached to the bus are addressable, with each device having a unique assigned address.

SUMMARY

Embodiments of the present invention disclose a method and system for presence detection of devices on a bus, the bus including a channel that can have two or more logical states. Device presence is detected by a controller of a bus transmitting a signal to one or more devices attached to the channel, to cause each of the one or more devices to hold the channel to a first logical state for a duration of time that is unique to each of the one or more devices. The device that holds the channel to the one of the two or more logical states for a duration of time that is longest is detected by the controller of the bus.

Other embodiments of the present invention disclose a method, and system for devices indicating presence on a bus that includes a channel that can have two or more logical states. Device presence is indicated by a device detecting the transmission of a signal on the channel of the bus at a first logical state. The device responds by holding the channel at the first logical state for a duration of time that is unique to the device and releases the channel at the end of the duration of time. In response to detecting that the channel remains at the first logical state following a release of the channel, the device holds the channel to the first logical state for the duration of time, following detection of the channel changing to a second logical state. In response to detecting the channel changing to the second logical state, following the release of the channel, the device remains idle until a second signal is received on the channel of the bus.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Figure 1:
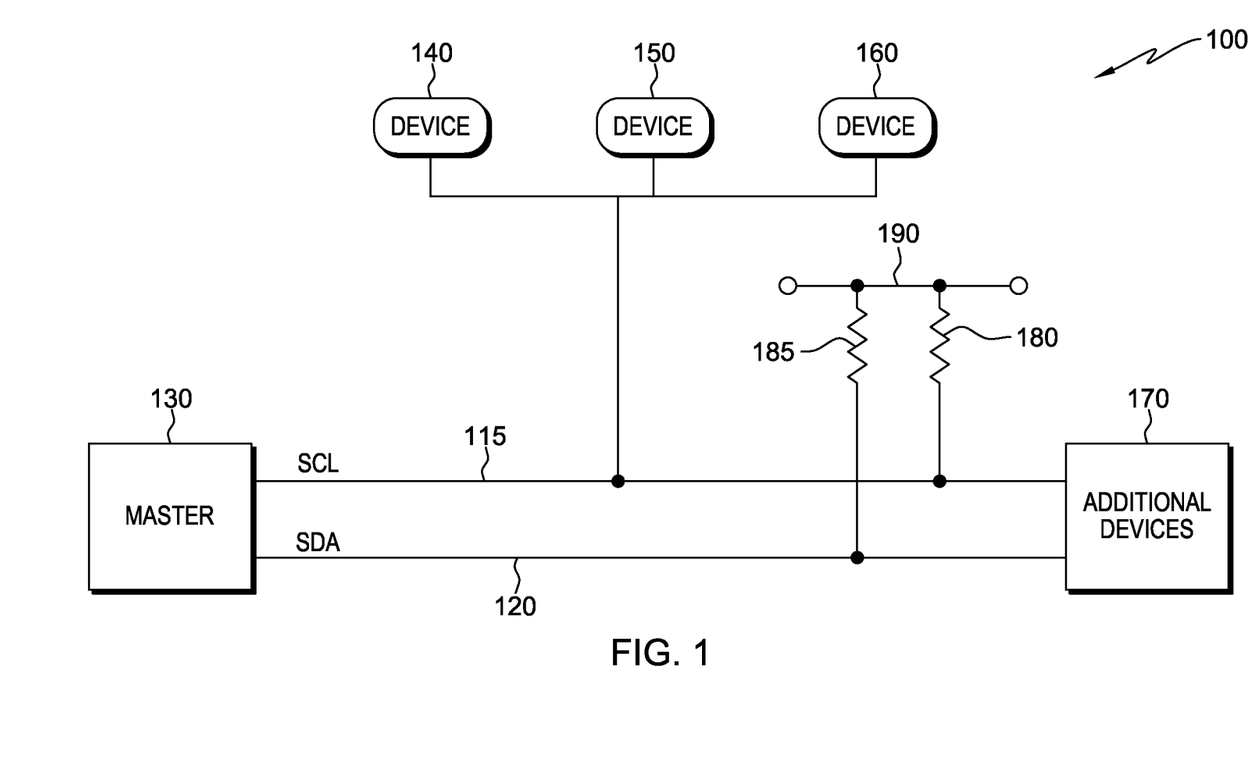
FIG. 1 is a functional block diagram illustrating a bus environment of an electronic device, in accordance with an embodiment of the present invention.

The present invention will now be described in detail with reference to the Figures. FIG. 1 is a functional block diagram illustrating a device presence detection environment, designated 100, in accordance with one embodiment of the present invention. Device presence detection environment 100 includes master 130, devices 140, 150, 160, additional devices 170, serial clock circuit line (SCL) 115, serial data circuit line (SDA) 120, pull-up resistors 180 and 185, and open drain 190. In a preferred embodiment of the present invention, the bus described below is an I2C bus, however it is acknowledged that other embodiments may include different bus architectures and protocols, properly configured for implementation. An I2C device presence detection environment, for example, includes a bi-directional communications channel, and may be part of the communications fabric of a computing device, such as a desktop computer, a laptop computer, a tablet computer, a netbook, a server computer, a personal data assistant (PDA), a smartphone, or may be included in electronic devices requiring signal processing, such as audio or video processing, or used in other control and signal processing applications.

The bus, for example, an I2C bus, is capable of handling one or more controlling devices, such as master 130. Master 130, also referred to as a controller of the bus, may include adequate logic or programmable capability to assume a controlling function for the bus, operating as a master role in a master/slave relationship, with the devices attached or connected to the bus. Master 130 is connected to SDA 120 and SCL 115 and controls clock signals transmitted on SCL 115 and transmits and receives data signals on SDA 120. Master 130 assigns a unique address for each device attached to the bus, establishing device identity in support of communications between master 130 and devices 140, 150, 160 and 170, for example.

SCL 115 and SDA 120 are each bi-directional signal lines forming the communications channels of the I2C bus, interconnecting attached devices and master controllers. SCL 115 carries clock signals produced by a master controller, such as master 130. The clock signals generally include two voltage states referred to as a logical high state and a logical low state. The minimum and maximum voltages for the high and low states are dependent on the bus speed mode implemented. Typically the low state is a non-zero voltage with a value near zero and the high state is discernable from the low state voltage by the attached devices and one or more master controller, and may be a value such as +3.3 V or +5.0 V, for example. SDA 120 carries data signals to and from master 130 and to and from devices attached to device presence detection environment 100, and similarly has a logical high state and a logical low state. The number of devices that can attach to a bus may be limited by address space, capacitance or physical space; for example, an I2C bus capacity is limited by the total bus capacitance of 400 pF.

Device presence detection environment 100 includes device 140, device 150, device 160, and additional devices 170, representing multiple devices attached to the I2C bus. Devices 140, 150, 160, and additional devices 170, may be devices such as a DVI display driver, an audio/video signal processor, an analog-to-digital converter, a digital-to-analog converter, a NVRAM chip for user settings, sensors for reading CPU temperature and fan speed, reading real-time clocks, monitoring voltages, turning the power supply of system components on and off, controlling OLED/LCD displays, and reading configuration data from SPD EEPROMS on various memory modules. Devices 140, 150, 160, and additional devices 170, typically function as slave devices in a master/slave relationship, however, a bus protocol, such as the I2C bus protocol, may allow devices operating at slower speeds to postpone master controller transmissions for a period of time, by forcing a bus line to a logical low state for a specific duration, generally referred to as clock-stretching. This is typically done by holding the SCL to a logical low state until the device is prepared to continue transmitting or receiving data.

SCL 115 and SDA 120 are shown in FIG. 1 as having pull-up resistors 180 and 185 attached, respectively. Pull-up resistors 180 and 185 are connected to open drain 190, and function to return bus lines SCL 115 and SDA 120 to a high state, once a device or controller has released the bus line from a logical low state. Open drain 190, also referred to as an open-collector for bipolar transistors, is a circuit technique used to allow multiple devices to communicate bi-directionally on a single wire. Open drain 190 operates with pull-up resistors 180 and 185 to hold the signal lines at a logical high state until a device on the wire sinks enough current to pull the line to a low state. Open drain 190 and pull-up resistors 180 and 185 function collectively to bring SDA 120 and SCL 115 bus lines to a logical high state, when the circuit lines have been released by device 140, 150, 160, or additional devices 170, or master 130, for example.

In a preferred embodiment of the present invention, one circuit line of device presence detection environment 100, such as SCL 115, for example, is used to detect or identify the presence of devices attached to the bus. This eliminates the need for multiple dedicated device pins for presence detection and offers flexibility in device design, card and board design, and reduced manufacturing costs. For exemplary purposes, the IC devices illustrated in FIG. 2 include devices 140, 150, and 160; however, the ideas discussed apply to any additional devices attached to the bus.

Figure 2:
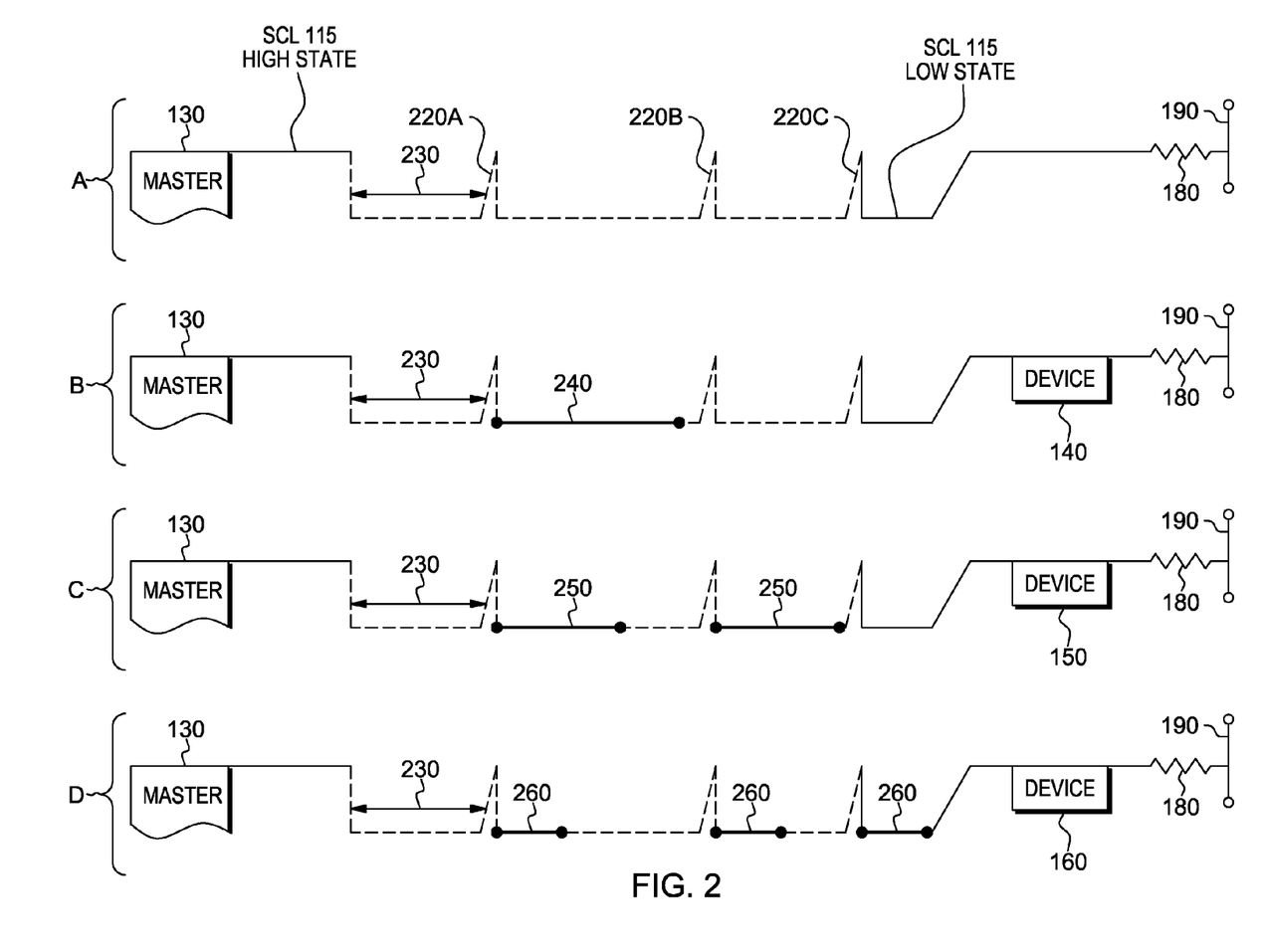
FIG. 2 is a block diagram illustrating the bus channel state of device presence routines within the bus environment of FIG. 1, in accordance with an embodiment of the present invention.

FIG. 2 is a block diagram illustrating the logical state and relative duration of the device signals transmitted simultaneously on SCL 115, to indicate the presence of each device, in accordance to an embodiment of the present invention. Each device attached to the bus, within device presence detection environment 100 of FIG. 1, stops on-going activity and transmits a signal, hereafter referred to as a presence routine, in response to detecting a specific command signal from the master bus controller. The presence routine of each device holds SCL 115 to a logical low state, for a duration of time, unique to each device attached to the bus. The presence command signal from the master controller and the presence routine for each device is shown separately as events A, B, C and D, for purposes of comparison of duration, however, all device presence routines are transmitted on SCL 115 simultaneously.

Event A illustrates the bus line state of SCL 115 as a function of time, for the presence command signal of master 130. Master 130 is a controller of the bus, as described with respect to FIG. 1, in accordance to an embodiment of the present invention. Event A includes the logical state of SCL 115 for master 130, device presence command 230, and three instances of logical state transition; transition 220A, 220B, and 220C. Event A also includes pull-up resistor 180, open drain 190, and labels for the logical high and logical low states of SCL 115. SCL 115 is shown with a logical high state, depicted with a solid line, and a logical low state depicted with a dashed line, also referred to as a "high state" and a "low state", respectively. Transition 220A, 220B, and 220C are shown with a dashed line to represent the transition of the bus line or channel, rising from the logical low state and reaching the logical high state long enough for devices to detect the logical high state.

Master 130 includes the operational logic to assume a controlling function for the bus, as described above. Master 130 issues device presence command 230 on SCL 115 line, which holds SCL 115 to the logical low state for a predefined duration of time, for example, 10 milliseconds (ms)+/−1 ms in one embodiment, that differs from other commands asserted by master 130. When device presence command 230 ends, SCL 115 begins transition 220A, in which SCL 115 begins rising from a logical low state towards a logical high state. Transition 220A marks the end of device presence command 230 and devices attached to SCL 115 follow the detection of 220A by substantially immediately (e.g. within 2 μs, in one embodiment), initiating their presence routine, each having unique duration. Transitions 220A, 220B, and 220C occur when master 130 or a device holding SCL 115 to a logical low state, releases SCL 115 and it rises to the logical high state. Pull-up resistor 180, connected to SCL 115 and to open drain 190, functions to return SCL 115 to a logical high state when SCL 115 is released from being held at a logical low state, as discussed above in FIG. 1.

Master 130 detects the duration of time that a device holds SCL 115 at the logical low state. After master 130 transmits device presence command 230 and detects SCL 115 at the logical high state for an extended duration of time, greater than 500 ms, for example, master 130 acknowledges that presence detection is complete and returns to normal operation.

Event B illustrates the bus line states of SCL 115 for the presence routine of device 140, in accordance to an embodiment of the present invention. Event B includes master 130, device 140, device presence command 230, presence routine 240, and three line state transitions, transition 220A, 220B, and 220C. Presence routine 240 is produced by device 140 and begins following device presence command 230 which holds SCL 115 to a logical low state for a predefined duration of time. Device 140 detects transition 220A following presence command 230 and initiates presence routine 240, which holds SCL 115 to a logical low state for a duration of time unique to device 140. As illustrated in FIG. 2, the length of presence routine 240 corresponds to the duration of time in which device 140 holds SCL 115 at a logical low state, which is a greater duration than the presence routine for devices 150 and 160. As presence routine 240 ends, SCL 115 begins to rise from its logical low state and device 140 detects this as transition 220B. The presence detection of device 140 is confirmed by device 140 detecting transition 220B after completing its presence routine, because the presence routine of device 140 is the last to release SCL 115, device 140 has the longest duration time of all devices on the bus. Device 140 acknowledges detection by setting an internal flag invoking a condition in which device 140 ignores SCL 115 until such time that a new command from master 130 is detected.

Event C illustrates the bus line states of SCL 115 for the presence detection time of device 150, in accordance to an embodiment of the present invention. Event C includes master 130, device 150, device presence command 230, and two iterations of presence routine 250 and three line state transitions, transition 220A, 220B, and 220C. Presence routine 250 is produced twice by device 150 and initiates for the first time following device presence command 230 which holds SCL 115 to a logical low state for a predefined duration of time. Device 150 detects transition 220A following presence command 230 and initiates presence routine 250, which holds SCL 115 to a logical low state for a duration unique to device 150. As illustrated in FIG. 2, the length of presence routine 250 corresponds to the duration of time in which it holds SCL 115 at a logical low state, which is greater than the presence routine of device 160, but less than the presence routine duration of device 140. Following the completion of presence routine 250, device 150 does not detect the rise of SCL to a logical high state, for example, transition 220B, because device 140 is still holding SCL 115 in a logical low state during presence routine 240. After completion of presence routine 250, device 150 determines SCL 115 is still at a logical low state and therefore device 150 has not been detected. When device 150 detects transition 220B changing to the logical high state of SCL 115, device 150 repeats presence routine 250. At the completion of the second iteration of presence routine 250, SCL 115 rises and device 150 detects transition 220C. This indicates that the presence of device 150 has been detected because for this iteration, presence routine 250 is the longest in duration of time. Device 150 is the last to release SCL 115 from the logical low state and in acknowledgement, device 150 sets an internal flag invoking a condition in which device 150 ignores SCL 115 until such time that a new command from master 130 is detected.

Event D illustrates the bus line states of SCL 115 for the presence detection time of device 160, in accordance to an embodiment of the present invention. Event D includes master 130, device 160, device presence command 230, three iterations of presence routine 260 and three line state transitions, transition 220A, 220B, and 220C. Presence routine 260 is produced three times by device 160 and is initiated for the first time at the detection of transition 220A following device presence command 230 which holds SCL 115 to a logical low state for a predefined duration of time. Presence routine 260 holds SCL 115 to a logical low state for a duration of time unique to device 160. As illustrated in FIG. 2, the length of presence routine 260 corresponds to the duration of time in which it holds SCL 115 at a logical low state, which is less than the presence routine duration of both devices 140 and 150. Following the completion of presence routine 260, device 160 does not substantially immediately (e.g. within 2 µs, for example, in one embodiment), detect the rise of SCL 115 towards the logical high state, such as transition 220B, because both device 140 and device 150 are still holding SCL 115 in a logical low state during their presence routines. Device 160 determines that its presence has not been detected and repeats presence routine 260 when transition 220B on SCL 115 changes towards a logical high state. At the completion of the second iteration of presence routine 260, again device 160 does not detect the rise of SCL 115 towards the logical high state, such as transition 220C, because device 150 is still holding SCL 115 in a logical low state during presence routine 250. Device 160 determines that it has not been detected, and when transition 220C changes towards the logical high state, repeats presence routine 260, again. Following the third iteration of presence routine 260 at which time device 160 releases SCL 115 from the logical low state, device 160 detects the rise of SCL 115 towards its logical high state and determines that device 160 has been detected. To acknowledge detection, device 160 sets an internal flag invoking a condition in which device 160 ignores SCL 115 until such time that a new command signal from a controller of the bus, for example, master 130, is detected.

In a preferred embodiment of the present invention, the unique duration times of the presence routines for devices attached to device presence detection environment 100 permits individual sequential detection of all devices, using a single bus line. Simultaneous initiation of presence routines following the completion of device presence command 230, results in the detection of the last device to release SCL 115, which is the device having the presence routine with the longest duration of time. Detected devices invoke a condition in which SCL 115 is ignored, permitting the device with the next longest presence routine duration to be detected. Devices continue to repeat their presence routine until detected at which time no device holds SCL 115 to a logical low state, and pull-up resistor 180 returns SCL 115 to a logical high state. Master 130 detects SCL 115 at a logical high state for an extended duration of time, which is predefined, and determines that all devices on the bus have been detected. In a preferred embodiment, no combinations of device presence routines have duration times equals to the presence routine duration time of a single device.

Figure 3:
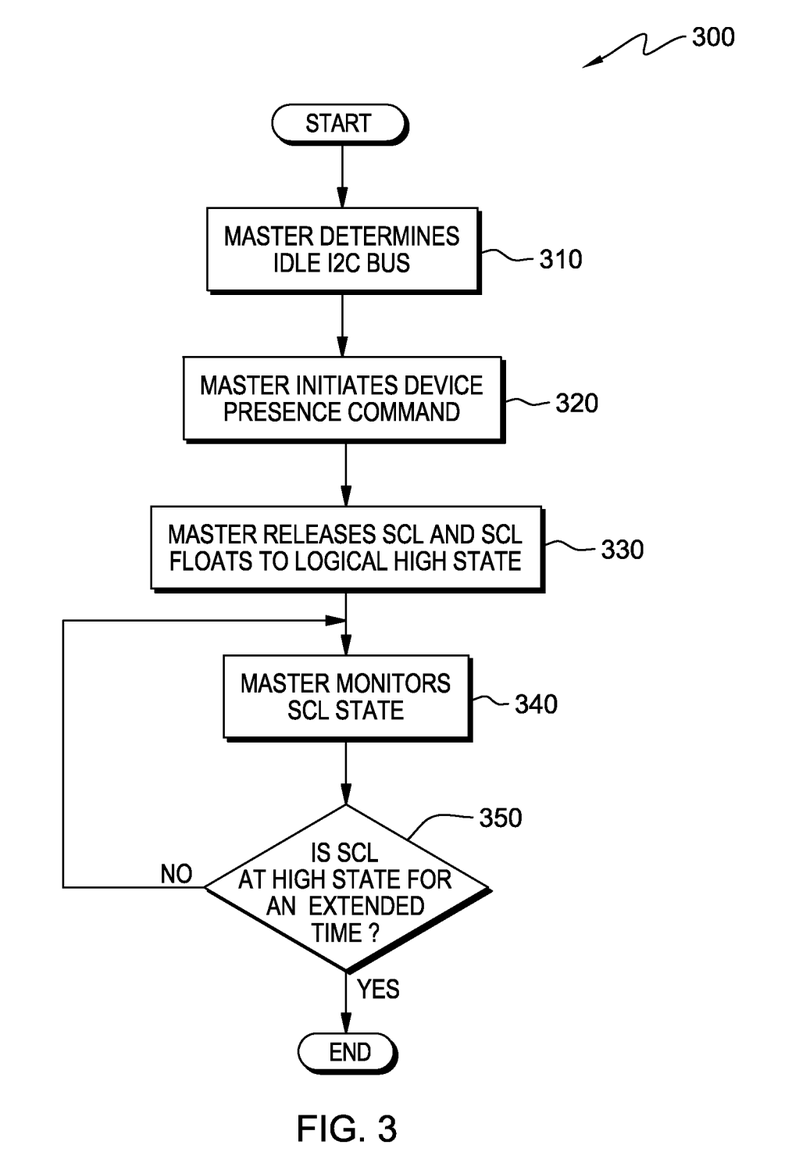
FIG. 3 is a flowchart of the operational steps of a presence detection command program, installed on a bus controller device within the bus environment of FIG. 1, in accordance with an embodiment of the present invention.

FIG. 3 illustrates a flowchart of the operational steps of presence detection command program 300, loaded onto a microprocessor within master 130 of the device presence detection environment 100 of FIG. 1, in accordance with an embodiment of the present invention. A bus master controller, for example, master 130, detects that the bus is idle (step 310). Detecting the presence of devices on the bus may occur on start up or a reboot operation or may occur when a device is added or removed from the bus during normal operation. Master 130 initiates a device presence command, for example, device presence command 230 (step 320), on the serial clock line of the bus, such as SCL 115.

Device presence command 230 holds SCL 115 to its logical low state, typically a near-zero voltage, for example. Device presence command 230 has a specified duration that is recognized by devices attached to the bus, for example 10 milliseconds (ms), +/−1 ms, in one embodiment. At the completion of device presence command 230, master 130 releases SCL 115 and the clock line is returned to its logical high state (step 330), by a pull-up resistor connected to an open drain circuit, for example pull-up resistor 180 connected to open drain 190, as depicted in FIG. 1.

Master 130 monitors SCL 115 continuously (step 340), while devices attached to the bus each execute a presence routine with a duration time unique to each device. Each device continues to repeat its respective presence routine until detected. Master 130 detects each device by the duration of the presence routine for each device. Devices attached to the bus respond after the completion of device presence command 230 by substantially simultaneously holding SCL 115 to a logical low state for a duration time that is unique to each attached device. If devices are still responding to device presence command 230, then master 130 detects SCL 115 to be at a logical low state (step 350, "no" branch), and master 130 continues to monitor the logical state of SCL 115. After all devices have been detected, SCL 115 is released and floats to the logical high state (i.e. returns to the logical high state via pull-up resistor 180). If master 130 detects a logical high state on SCL 115 for an extended period of time (step 350, "yes" branch), for example, more than 500 ms, in one embodiment, then device presence detection is complete and detection command program 300 ends.

Figure 4:
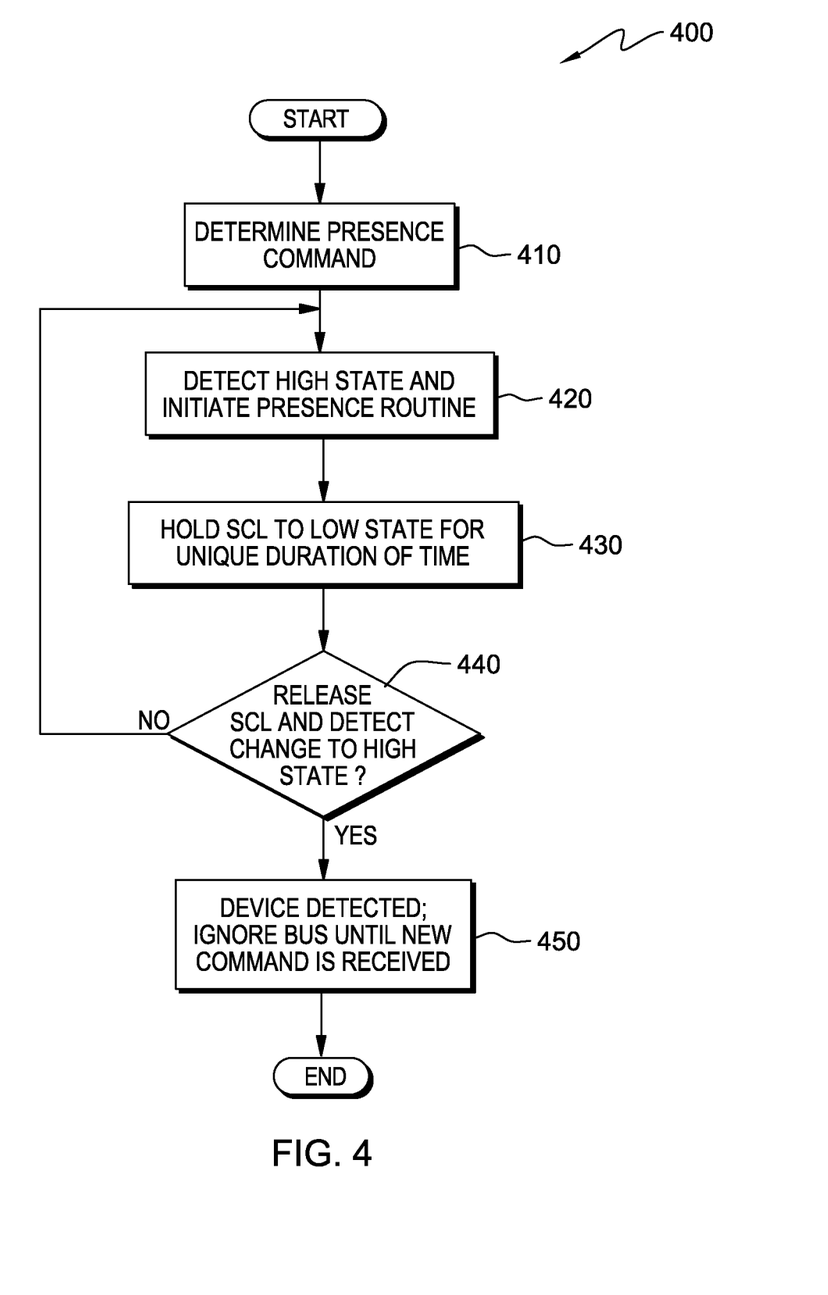
FIG. 4 illustrates the operational steps of a device presence routine program installed on an bus environment of FIG. 1, in accordance with an embodiment of the present invention.

FIG. 4 illustrates a flowchart of the operational steps of presence routine program 400, loaded onto the devices of the bus environment of FIG. 1, in accordance with an embodiment of the present invention. A device attached to a bus channel or circuit line, for example the I2C bus clock line, detects the clock line being held to a logical low state for a specific period of time. The device determines that the logical low state period is a command for all devices on the bus to initiate their presence routines (step 410). For example, device 140, attached to SCL 115, detects SCL 115 at a logical low state for 10 ms+/−1 ms, and recognizes the logical low state for a specific period of time to correspond to detect presence command 230.

The device detects the state of the clock line returning to the logical high state and initiates the presence routine unique to that device (step 420). If multiple devices are attached to the clock line of the I2C bus, all devices initiate their presence routine substantially simultaneous. The device presence routine holds the clock line at the logical low state for a time duration that is unique to the specific IC device (step 430). For example, device 140 detects SCL 115 returning to a logical high state at the completion of device presence command 230, and initiates its presence routine activities. Device 140 holds SCL 115 at the logical low state for a time duration that is unique to device 140, for example, 1 ms.

The device releases the clock line at the logical low state and checks if the clock line substantially immediately (e.g. within 1-2 μs, in one embodiment), returns to the logical high state (step 440). Because each device attached to the I2C bus has a unique presence routine duration, the device with the longest presence routine duration will detect the clock line returning to the high state substantially immediately after the device releases the line. Other devices with shorter presence routine durations will not detect the clock line returning to the logical high state. If the device releases the clock line following its presence routine and detects the clock line return to the logical high state (step 440, "yes" branch), then the device has the longest presence routine duration of the devices on the bus whose presence has not yet been detected.

For example, device 140 completes its presence routine having a unique duration and releases SCL 115, which returns to the logical high state, indicating that device 140 has the longest presence routine duration of the devices whose presence has not yet been detected. Other devices attached to SCL 115, such as device 150, did not detect SCL 115 returning to the logical high state after releasing SCL 115 from the logical low state. This indicates that the presence routine duration of device 150 was less than that of another device attached to SCL 115, such as device 140.

Following step 440, "yes" branch, the device having the longest presence routine duration and detecting the clock line return to the logical high state after releasing the clock line at the completion of its presence routine, is detected. The device responds by setting a condition flag indicating the device is detected. The detected device remains idle, ignoring additional presence routines on the clock line until a new command is received from the master microcontroller (step 450), and presence routine program 400 ends.

If the device releases the clock line and does not substantially immediately detect the clock line returning to the logical high state (step 440, "no" branch) then the device waits until it detects the clock line returning to the logical high state and repeats its presence routine (step 420). The device proceeds as previously described above, by repeating its presence routine.

Figure 5:
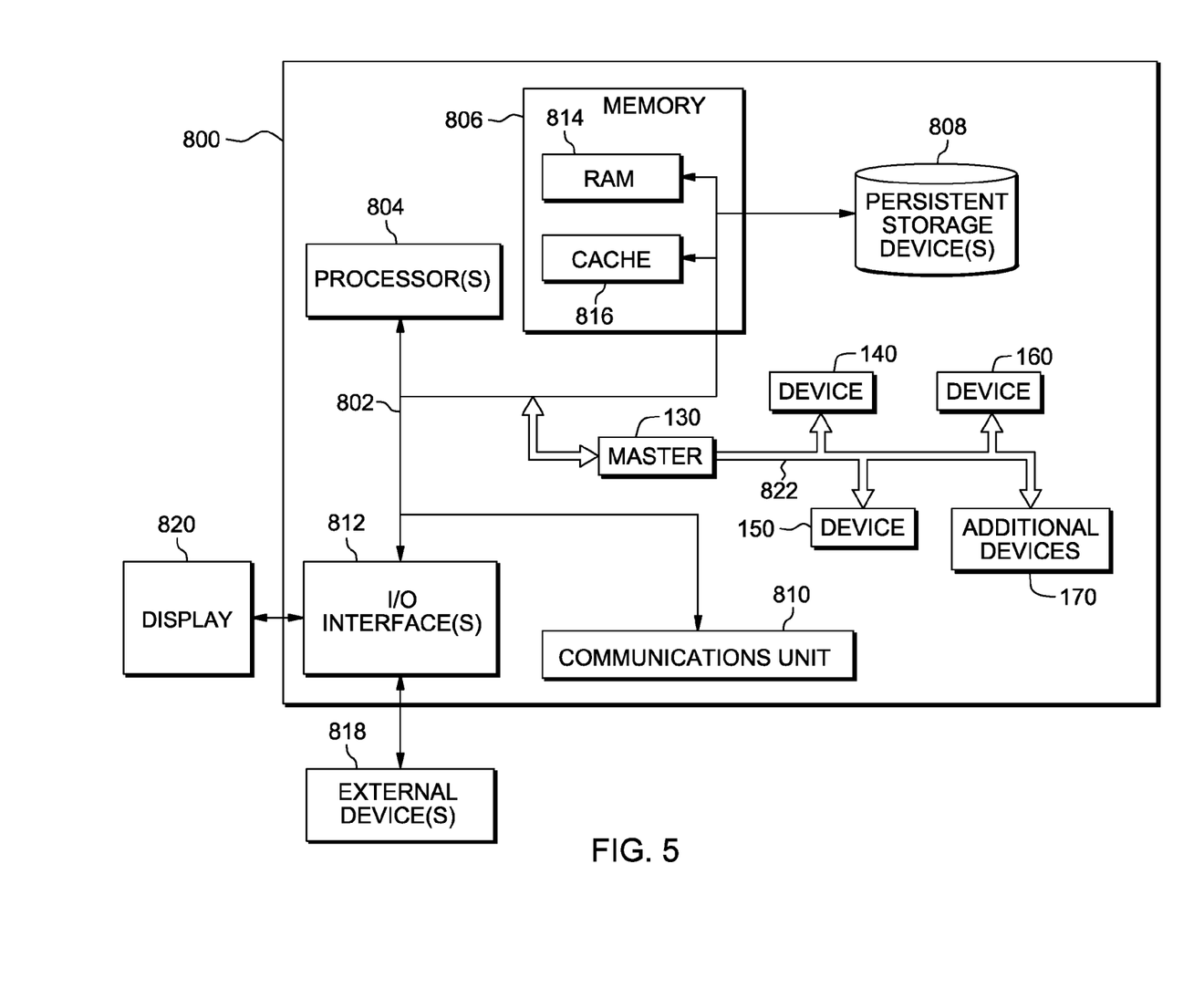
FIG. 5 depicts a block diagram of the components of an exemplary electronic device on which the presence detection program and presence routine program are executed, in accordance with an embodiment of the present invention.

FIG. 5 depicts a block diagram of components of a computing device in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses and includes bus 822 which connects devices 140, 150, 160, and 170 to master 130. Master 130 is connected to computing device 800 processors by communications fabric 802. Devices 140, 150, 160 and 170 can be devices such as a DVI display driver, an audio/video signal processor, an analog to digital converter, a digital to analog converter, a NVRAM chip for user settings, sensors for reading CPU temperature and fan speed, reading real-time clocks, monitoring voltages, turning the power supply of system components on and off, controlling OLED/LCD displays, and reading configuration data from SPD EEPROMS on various memory modules. Devices 140, 150, 160 and additional devices 170 typically function as slave devices in a master/slave relationship.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Presence detection command program 300 and presence routine program 400 are stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

In a preferred embodiment bus 822 is an I2C bi-directional, two-line bus including a serial clock line and a serial data line. The I2C bus 822 serial clock line is used by master 130 to issue a presence detection command to devices 140, 150, 160 and other devices 170, and used by the devices to present their respective presence routines. Although a single instance of bus 822 is depicted in FIG. 5, other embodiments may include multiple instances of bus 822, and implementations may be configured to use clock lines, data lines or other lines of a bus that provides logical states such that presence commands and presence routines can be presented.

Communications unit 810, in these examples, provides for communications with other data processing systems or devices, including resources of an enterprise grid and client devices. In these examples, communications unit 810 includes one or more network interface cards. Communications unit 810 may provide communications through the use of either or both physical and wireless communications links. Presence detection command program 300 may be loaded to master 130 and presence routine program 400 may be loaded to devices 140, 150, 160 and additional devices 170. Alternatively presence detection command program 300 and presence routine program 400 may be downloaded to persistent storage 808 through communications unit 810.

I/I interface(s) 812 allows for input and output of data with other devices that may be connected to server computer 800. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., presence detection command program 300 and presence routine program 400, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to detect a presence of devices on a bus, the bus including a channel having at least two logical states, the method comprising:
   transmitting a signal on the channel, to cause each of one or more devices connected to the channel to release the channel after holding the channel to a first logical state for a duration of time that is unique to each of the one or more devices; and
   detecting a device of the one or more devices that releases the channel last after holding the channel to the first logical state for a duration of time that is longest.

2. The method of claim 1, wherein the step of transmitting the signal, further comprising:
   holding the channel to the first logical state for a predefined duration of time.

3. The method of claim 1, wherein the bus is an I2C bus.

4. The method of claim 1, further comprising:
   detecting the channel to be at a second logical state for a predefined duration of time following transmitting the signal, indicating that all of the one or more devices have been detected.

5. A method for indicating a presence of devices on a bus, the bus including a channel having at least two logical states and one or more devices connected to the channel, the method comprising:
   in response to receiving a first signal on the channel of the bus, holding the channel to a first logical state for a duration of time that is unique to a device;
   releasing the channel, at an end of the duration of time;
   in response to detecting that the channel remains at the first logical state following a release of the channel, holding the channel to the first logical state for the duration of time, following detection of the channel changing to a second logical state; and
   in response to detecting the channel changing to the second logical state following the release of the channel, remaining idle until a second signal is received on the channel of the bus.

6. The method of claim 5, wherein the devices on the bus include integrated circuit (IC) devices attached to the channel of the bus.

7. The method of claim 5, wherein the device receiving a first signal further includes a controller of the bus transmitting the first signal.

8. The method of claim 5, wherein the step in response to receiving the first signal, further comprises:
   detecting that the first signal holds the channel at the first logical state for a predefined duration of time.

9. The method of claim 5, wherein the bus is an I2C bus.

10. A system for detecting a presence of devices on a bus, the system comprising:
    a bus that includes a channel having at least two logical states, one or more devices connected to the channel and at least one controller of the bus having operational logic to:
    transmit a signal on the channel to cause each of the one or more devices to release the channel after holding the channel to a first logical state for a duration of time that is unique to each of the one or more devices; and
    detecting a device of the one or more devices that releases the channel last after holding the channel to the first logical state for a duration of time that is longest.

11. The system of claim 10, wherein the operational logic to transmit the signal further comprises:
    holding the channel at the first logical state for a predefined duration of time.

12. The system of claim 10, wherein the bus is an I2C bus.

13. The system of claim 10, wherein the operational logic of detecting the channel to be at a second logical state for a predefined duration of time, indicates that all of the one or more devices have been detected.

14. The system of claim 10, wherein the system further comprises:
    one or more devices attached to the channel, each device having operational logic to:
    respond to a first signal detected on the channel of the bus by holding the channel to a first logical state for a duration of time that is unique to a device;
    release the channel at an end of the duration of time;
    respond to detection of the channel remaining at the first logical state following a release of the channel, by holding the channel to the first logical state for the duration of time, following detection of the channel changing to a second logical state; and
    respond to detecting the channel changing to the second logical state following the release of the channel, by remaining idle until a second signal is received on the channel of the bus.

15. The system of claim 14, wherein the devices include integrated circuit (IC) devices connected to the channel of the bus.

16. The system of claim 14, wherein the operational logic of the device receiving a first signal further includes the controller of the bus transmitting the first signal.

17. The system of claim 14, wherein the operational logic in response to receiving the first signal, further comprises:
   detecting that the first signal holds the channel to the first logical state for a predefined duration of time.

18. The system of claim 14, wherein the bus is an I2C bus.

* * * * *